(No Model.) 4 Sheets—Sheet 1.
W. H. BLAKE.
AUTOMATIC VALVE MOTION FOR STEAM ENGINES.
No. 428,449. Patented May 20, 1890.
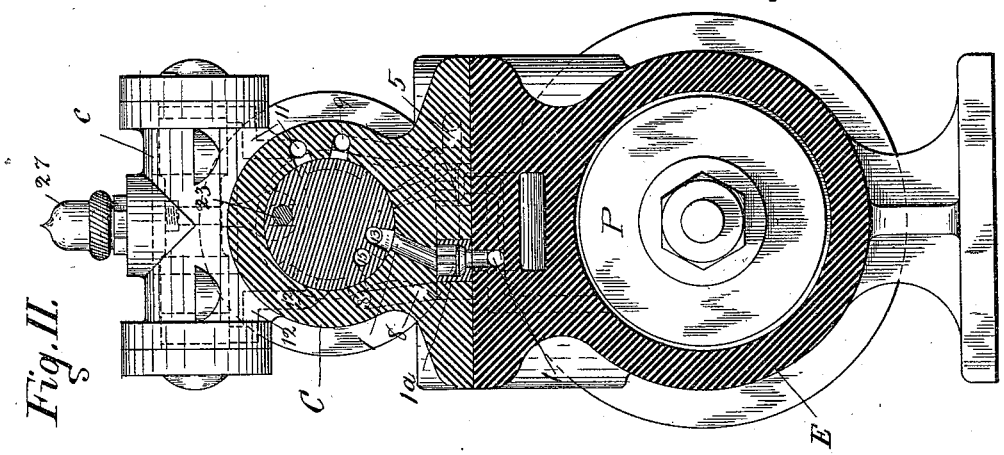
Fig. II.
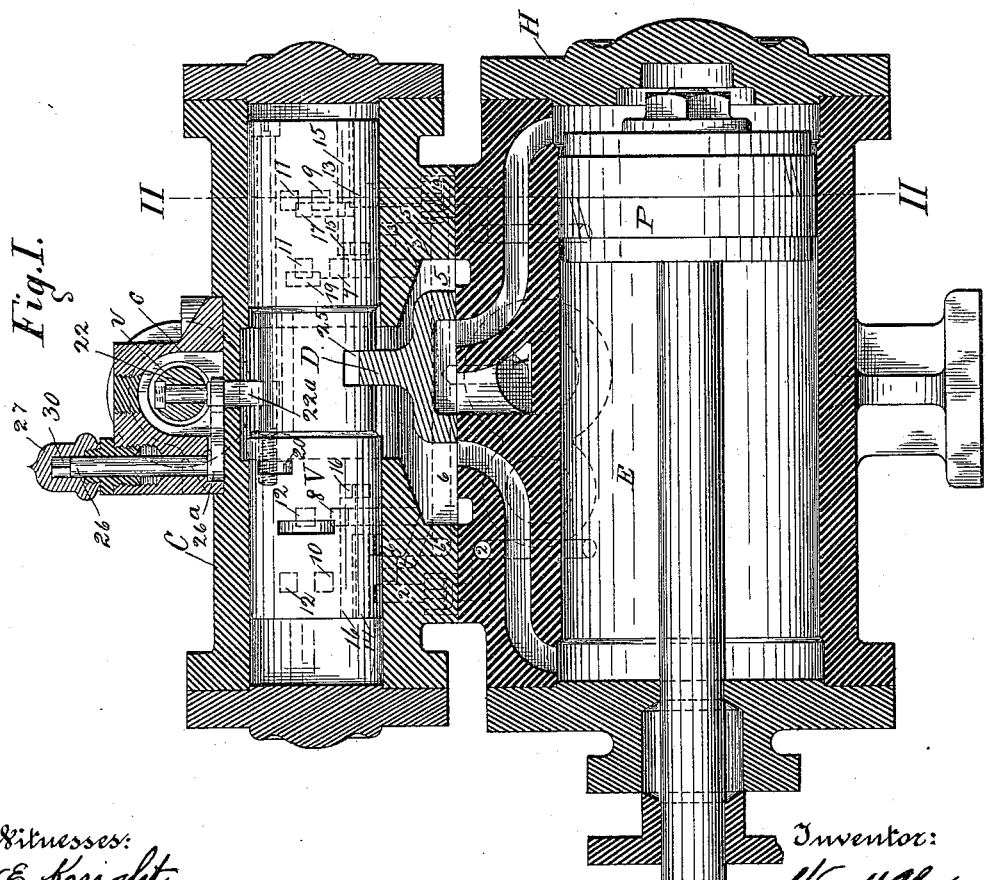
Fig. I.
Witnesses:
W. E. Knight
E. Arthur
Inventor:
Wm H Blake
By his Attorneys
Knight Bros (No Model.) 4 Sheets—Sheet 2.
W. H. BLAKE.
AUTOMATIC VALVE MOTION FOR STEAM ENGINES.
No. 428,449. Patented May 20, 1890.
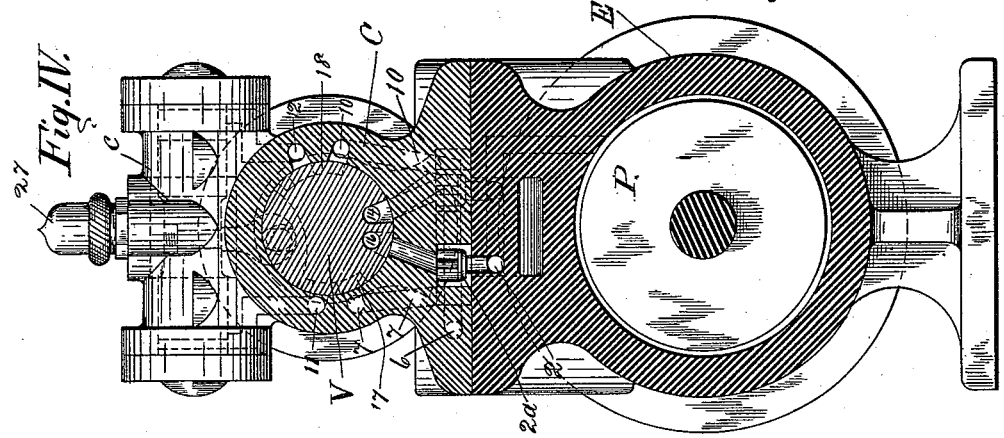
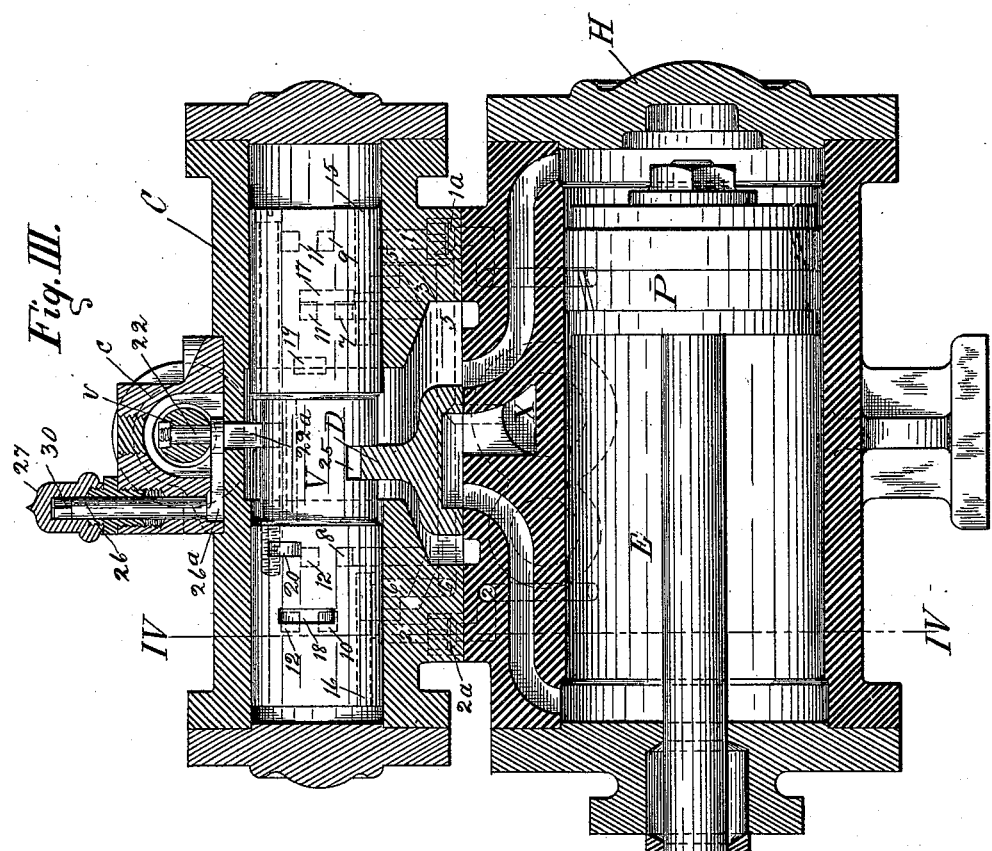
Witnesses:
W. E. Knight.
E. Arthur.
Inventor:
Wm. H. Blake
By his Attorneys
Knight Bros.

(No Model.) 4 Sheets—Sheet 3.
W. H. BLAKE.
AUTOMATIC VALVE MOTION FOR STEAM ENGINES.
No. 428,449. Patented May 20, 1890.
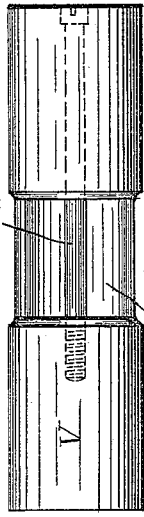
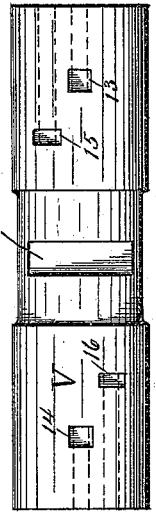
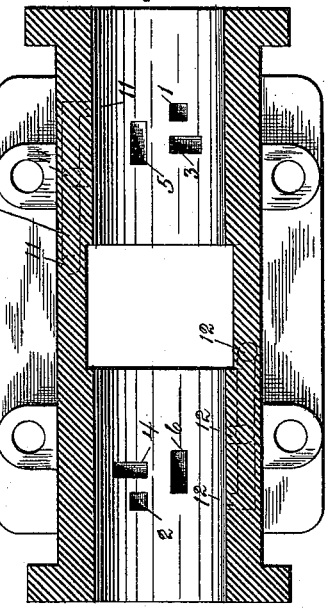
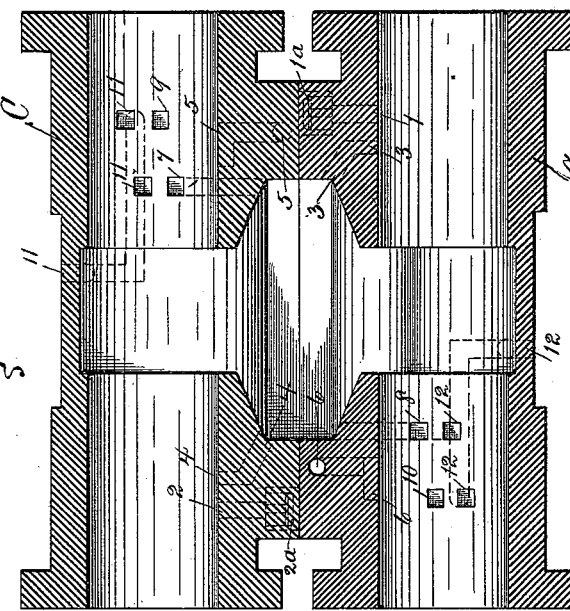
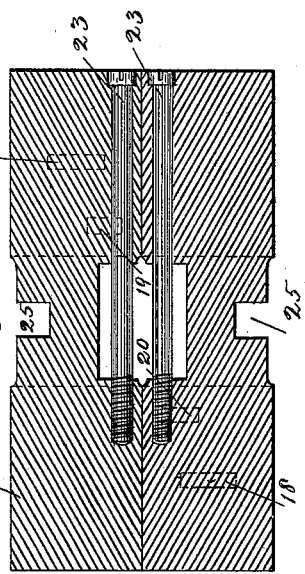
Witnesses:
W. E. Knight
E. Arthur
Inventor:
Wm. H. Blake
By his Attorneys
Knight Bros.

(No Model.) 4 Sheets—Sheet 4.
W. H. BLAKE.
AUTOMATIC VALVE MOTION FOR STEAM ENGINES.
No. 428,449. Patented May 20, 1890.
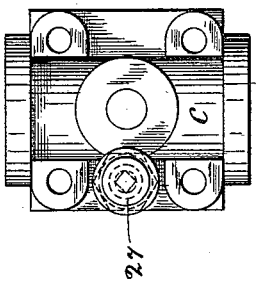
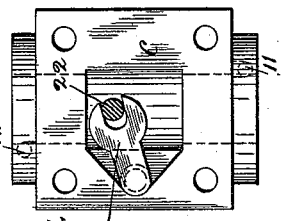
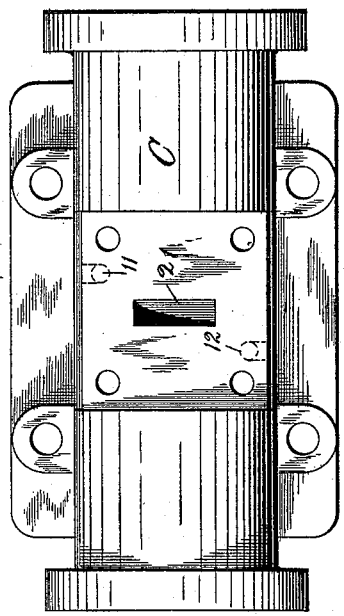
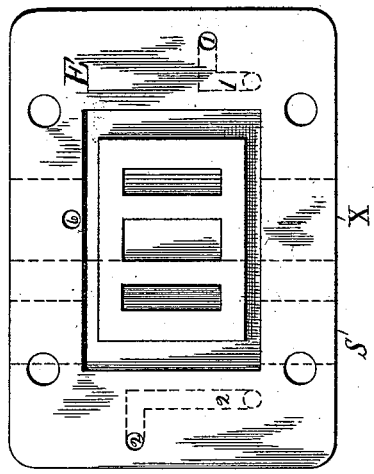
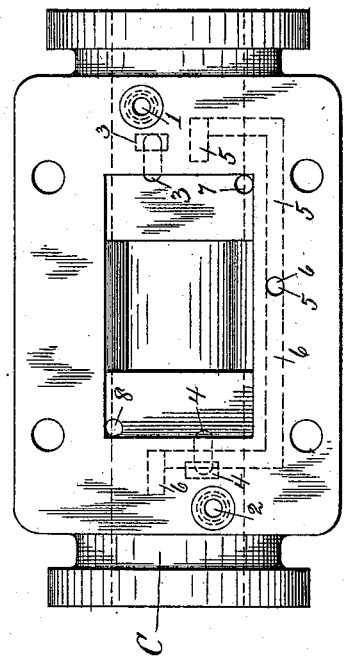
Witnesses:
W. E. Knight.
E. Arthur.
Inventor:
Wm. H. Blake
By his Attorneys
Knight Bros.

UNITED STATES PATENT OFFICE.

WILLIAM H. BLAKE, OF WARREN, MASSACHUSETTS.

AUTOMATIC VALVE-MOTION FOR STEAM-ENGINES.

SPECIFICATION forming part of Letters Patent No. 428,449, dated May 20, 1890.

Application filed January 7, 1890. Serial No. 336,193. (No model.)

*To all whom it may concern:*

Be it known that I, WILLIAM H. BLAKE, a citizen of the United States, residing at Warren, in the county of Worcester and State of Massachusetts, have invented a new and useful Improvement in Automatic Valve-Motion for Steam-Engines, of which the following is a specification.

My invention consists in a steam-actuated valve, and is primarily intended for operating the engine of a steam-pump and like direct-acting engines. In this class of engines it has been common to employ, in connection with a slide-valve of common form, a supplemental steam-piston for operating said valve, having a compound rectilinear and oscillating movement, the oscillating movement being in some instances imparted by mechanical means through the agency of tappets on the main piston-rod and causing the opening alternately of suitable ports in the supplemental piston, which thus acts as its own valve, the steam thereby admitted to the ends of the supplemental cylinder alternately imparting the longitudinal movement to the piston therein, which actuates the slide-valve of the main engine.

In my improvement the valve and its accessories are so constructed that extraneous mechanism for imparting the oscillating or other preliminary movement to the cylindrical valve-piston is dispensed with, the oscillatory movement of the valve-piston being imparted by steam through the agency of a transverse supplemental steam-actuated piston, the steam-ports of which are governed by the movement of the main-valve piston itself, as hereinafter described.

My improvements also relate to details in the construction of the main and supplementary steam-valves and in the arrangement of ports therein, and in the steam-chests themselves, as hereinafter pointed out; also in the combination and arrangement of steam-ports and check-valves in the main steam-chest to effect the preliminary endwise movement of the main steam-valve under control of the movement of the main piston, as hereinafter described.

My improvements further consist in the combination, with my improved steam-actuated valve, as herein set forth, of a device by which the oscillatory movement may be imparted to the valve by mechanical means when required, in the event of sticking from rust or other cause after the engine has been at rest.

In order that my invention may be fully understood, I will proceed to describe the same with reference to the accompanying drawings, in which—

Figure I is a vertical longitudinal section of the valve and its accessories applied to the engine of an ordinary direct-acting steam-pump, a portion only of the pump being shown, and representing the main piston at the outer end of its stroke. Fig. II is a transverse section on the line II II, Fig. I, viewed from the outer end, showing the parts in the same position. Fig. III is a vertical longitudinal section showing the position of the parts when the piston of the main engine is on its return-stroke. Fig. IV is a transverse section on the line IV IV, Fig. III, viewed from the inner or center piece end, showing the position of the valve and its ports at this part of the movement. Fig. V is a compound longitudinal section of the main steam-chest on the line V V, Fig. II, showing it laid open or viewed in both directions from the same central longitudinal plane. Fig. V$^a$ is a similar compound sectional view of the main-valve piston. Figs. VI and VI$^a$ are respectively a top and bottom view of the main-valve piston. Fig. VII is a horizontal section of the main steam-chest. Figs. VII$^a$ and VII$^b$ are respectively a bottom view of the main steam-chest and a top view of the main steam-cylinder on which it is superposed, showing the relative and corresponding arrangement of the ports therein. Figs. VIII and VIII$^a$ are respectively a top and bottom view of the small or supplemental steam-chest. Fig. VIII$^b$ is a top view of the main steam-chest with the small supplemental steam-chest removed.

I have here represented my invention in its application to a simple direct-acting engine suitable for operating a steam-pump, the pump-cylinder of which is not shown.

E represents the engine-cylinder, P the piston working therein, and H the outer head of the cylinder. The inner end may be closed by a head of usual construction with customary stuffing-box or with a center piece to separate the steam-cylinder from the pump-cylinder, and these may be brought into as close juxtaposition as desired. My valve-motion, being entirely steam-actuated, dispenses with the need of any tappet arrangement, such as is commonly used on the main piston-rod to start the longitudinal movement or impart an oscillatory movement to a steam-actuated valve.

D represents a simple slide-valve of ordinary form, which may have a flat face, and is reciprocated longitudinally by the valve-piston V, as I will now describe.

Fig. I represents the main piston P, just reaching the extremity of its outer stroke, uncovering the port 1, to which live steam is thus admitted from the cylinder E, raising the check-valve 1$^a$ and admitting the steam through the port 13 in the main-valve piston V to the outer end of the steam-chest C, producing pressure against the end of the valve-piston V and starting it on its return-stroke. When the valve-piston V has traveled one-eighth of an inch or thereabout, the port 13 commences opening to the live-steam port 3 of the steam-chest, which carries the valve-piston V and valve D the remainder of their combined longitudinal stroke, the steam exhausting at the center-piece end of the steam-chest and cutting off at the outer or head end at the same time. It will be seen that the face of the piston-port 13 is slightly wider than the distance between the ports 1 and 3 in the wall of the steam-chest, causing the piston-port 13 to open to the live steam through the port 3 before closing to the port 1. The working parts are so proportioned that the slide-valve D has to travel three-sixteenths of an inch before cutting off steam from the steam-cylinder E, while the valve-piston V travels but five thirty-seconds before cutting off the port 1. Live steam is thus left in the main cylinder E after the port 1 is cut off and the port 3 opened one thirty-second of an inch, rendering it impossible for the valve-piston V to stop until it has completed its full stroke, which is three-eighths of an inch in the proportions here shown. When the valve-piston V has completed its stroke and the engine-piston P is on its return-stroke, as shown in Fig. III, the live-steam port 7 is connected with the port 11 of the transverse supplementary valve-cylinder c, while the exhaust-port 10 is connected through the port 18 of the valve-piston V with the port 12 of the supplementary valve-cylinder c. The small valve-cylinder c now takes steam through the ports 7, 17, and 11 while exhausting through the ports 12, 18, and 10 to the exhaust end of the main-valve cylinder C. The movement thus imparted to the small valve-piston v transversely to the main-valve piston V turns the said main-valve piston V on its axis by means of the vertical pin 22′, which is rigidly secured to the small transverse valve-piston v, as shown in Figs. II and IV, and provided with a forked lower end 22$^a$, engaging with a pin 23, which is screwed longitudinally into the piston-valve V, as shown in Fig. VI, a central cavity 24 being provided in the upper face of the valve-piston for the reception and free play of the forked end 22$^a$ of the said operating-pin, as shown in Figs. V, VII, and VII$^a$. Dotted lines in Figs. I and VII$^b$ show the live-steam ports S and the main exhaust-port X in the steam-chest of the main cylinder E. Both the piston-ports 14 and 13 are now open to what is the exhaust until the main-piston head P passes the port 2 near the center-piece end and lets in live steam, which carries the main-valve piston V back, imparting a reverse movement to the slide-valve D, restoring it to the position shown in Fig. I, and by the reverse action of the small transverse valve-piston v rolling the main-valve piston V back to its original position. (Shown in Fig. II.) As soon as the piston P of the main engine admits steam through the ports 1 and 2 the stroke of the valve-piston V is made instantaneously, there being nothing to oppose it save the friction of the slide-valve D. As soon as the piston-ports 13 and 14 are cut off a cushion is formed on the exhaust end of the main-valve piston V, a free way of one-sixteenth of an inch being allowed for this purpose; but if this fails to stop the stroke of the valve-piston V, then the cushion-port 15 or 16 opens to the steam-port 3 or 4, admitting live steam to the end of the valve-cylinder C, forming a live-steam cushion and preventing the valve-piston from striking the cylinder-head.

If the valve-pistons are properly ground, they will stop as soon as the ports are cut off. If this occurs before the rolling or oscillatory movement is imparted to the main-valve piston V by the action of the small supplemental valve-piston v, then the operation of check-valves 1$^a$ and 2$^a$ in the ports 1 and 2, respectively, is not needed; but in case the main-valve piston V continues its stroke while being turned or rolled by the small valve-piston v, then the check-valve is needed in order to form a cushion, as the port 1 or 2 being open to the exhaust would permit a "blow" or escape of live steam upon the opening of the cushion-port to the live-steam port. The cushion-ports 15 and 16 and the live-steam ports 3 and 4 are made long on the face in a circumferential direction, so that the piston, though turned in either position, will connect if the live-steam cushion be needed. The cushion for the small valve-piston v is similar to that of the main-valve piston V, the rolling of the main-valve piston V acting for the connection between the small piston-ports and the live-steam ports. In practice a free way or roll of one-sixteenth of an inch is allowed for cushioning, and if this be exceeded it causes a connection of the exhaust end of the small transverse cylinder c with the live-steam port by the cushion-port 19 or 20.

The forked pin 22 22$^a$, which connects the small transverse piston v with the main-valve piston V in order to oscillate the same, is turned off to reduce its size to pass vertically through the center of the small piston v, leaving a shoulder below, and is rigidly secured to said piston by a nut on top. The main-valve piston V is connected to the fork 22ª of the pin 22 by a screw-pin 23, as before stated, and as shown in Figs. I, II, III, and VI, the said pin 23 being inserted longitudinally in the valve-piston V and extending from end to end of the longitudinal cavity 24, which is of sufficient length to permit the longitudinal movement of the pin 23 back and forth through the fork 22ª and of sufficient width to permit the oscillatory movement of the valve-piston V, as already explained. The main slide-valve D may be of the customary D form, with the simple flat face, which possesses many well-known advantages over a curved or irregular face, and is connected to the valve-piston V, so as to derive longitudinal movement therefrom, while permitting independent oscillatory movement to the valve-piston V by means of a transverse cavity 25, milled out in the bottom of the valve-piston V at its center, as shown in Figs. I, III, and VI².

In case a pump stands at rest for some time the valve-pistons are liable to rust to a slight extent, causing them to stick and rendering it necessary to start them by mechanical means. For this purpose I have provided a starting-bar 26, in the form of a crank-shaft journaled vertically in a stuffing-box surmounting the valve-chest C, and having a forked arm 26ª, engaging with the forked pin 22 between the top of the main valve-chest C and the bottom of the small piston v, as shown in Figs. I and VIIIª. This vertical shaft is rocked by means of a key applied to a square 30 on its upper end, and when not in use it is covered by a cap or "acorn" 27, screwed on the packing-gland, as shown in Fig. I. I thus cover up the only movable part of the pump visible, except the main piston-rod between the stuffing-box of the steam and pump cylinders, and these may be dispensed with. There being no arm or connection whatever on the piston-rod, the pump or water cylinder can be placed closer to the steam-cylinder than on ordinary steam-pumps, making a short center piece, all the room necessary being to pack the stuffing-box between the cylinders.

The oil cup or tube of the small steam-chest C furnishes lubrication for all parts of the engine or steam end of the pump.

The check-valves 1ª and 2ª in the ports 1 and 2 may be of brass pressed into the bottom of the chest.

My improvements render the valve-motion altogether self-acting, there being no dead-center at any part of the stroke under any circumstances.

Having thus described my invention, the following is what I claim as new therein and desire to secure by Letters Patent:

1. The transverse supplementary steam-chest c and piston v working therein, combined with the main-valve piston V, for imparting an oscillatory movement to the same, substantially as herein described.

2. The combination, with the steam-engine valve D, of the valve-piston V, imparting longitudinal sliding movement thereto, and means within the casing actuated solely by steam-pressure for imparting an oscillatory movement to the said valve-piston V to open and close its steam-ports, substantially as hereinbefore explained.

3. The combination of the valve-piston V, supplementary piston v, and connecting-pins 22 and 23, substantially as and for the purposes set forth.

4. In combination with the valve-piston V, the main cylinder E, having the ports 1 and 2 for starting the piston V on its longitudinal strokes, the supplementary piston v, for imparting an oscillatory motion to said piston V, and suitable ports in the piston and casing for imparting motion to the supplementary piston, substantially as herein described.

5. The combination, with the valve-piston V, chest C, ports 1 2 3 4 13 14, and cushion-ports 15 16, of the check-valves 1ª 2ª in the ports 1 and 2 to prevent the escape of live steam in cushioning the valve-piston V, as explained.

6. The combination, with the valve-piston V, supplementary piston v, and connections 22 23, for oscillating the valve-piston, of the crank-shaft 26 26ª, for turning the valve-piston V by mechanical means, substantially as set forth.

WILLIAM H. BLAKE.

Witnesses:
JOHN B. GOULD,
HENRY S. HOWE.